July 28, 1936.  F. KAHN  2,049,065

MECHANISM FOR REGULATING TRANSMISSION SPEEDS

Filed May 27, 1933  2 Sheets-Sheet 1

INVENTOR
FRED KAHN
BY O. S. Leszay
ATTORNEY

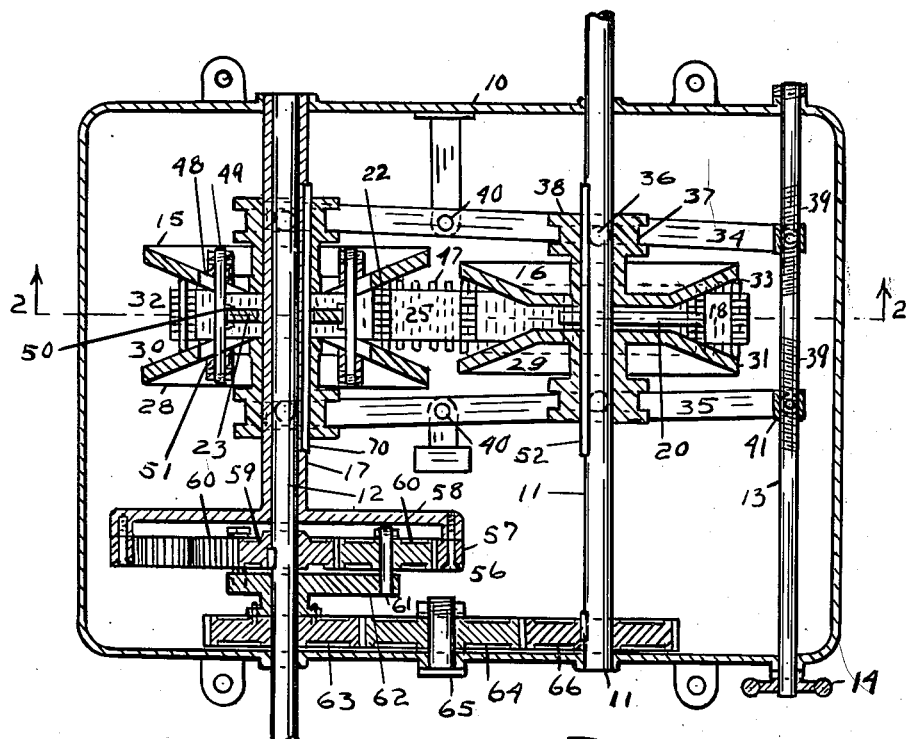
Fig. 3
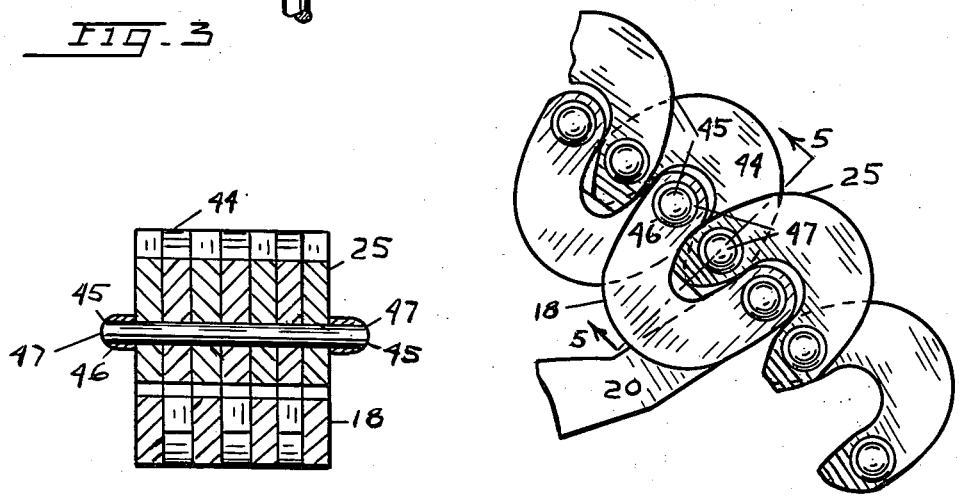
Fig. 5
Fig. 4
INVENTOR
FRED KAHN
BY O. S. Leozay
ATTORNEY Patented July 28, 1936

2,049,065

UNITED STATES PATENT OFFICE 2,049,065

MECHANISM FOR REGULATING TRANSMISSION SPEEDS

Fred Kahn, New York, N. Y.

Application May 27, 1933, Serial No. 673,141

6 Claims. (Cl. 74—244)

This invention relates to a mechanism for regulating transmission speeds and its object is to provide means for transmitting power from one shaft to another and varying the relative rotations of the said shafts.

A further object is to provide means to vary the ratio of speed of a driven element with respect to a driving element and to compound the said ratio by transmitting the force through a secondary means co-operating with the said driven and driving elements.

Another object is to provide collapsible contact means on a rotatable member to receive and cooperate with a flexible element to transmit power to another rotatable member.

Another object is the provision of driving and driven expansible assembly units each having inclined contact surfaces which are adjustable to approach and to recede relatively opposite to the movements of the opposed assembly unit.

A further object is to combine oppositely adjustable, beveled driving and driven units in correlation with a chain which is radially adjustable on the said units, both by contact on the beveled surfaces thereof and by meshed contact on collapsible receiving chains connected to the said units.

Another feature is the combination of expansible and contractible driving and driven elements and correlated connecting means with an auxiliary planetary differential.

The foregoing and other objects and features of the invention are fully described in the following specification and claims, and illustrated in the accompanying drawings, in which:

Fig. 3 is a plan section on the line 3—3 of Figure 1.

Fig. 4 is an enlarged fragmentary view of driving and collapsible chain elements as seen within the limits of the line 4 of Figure 2.

Fig. 5 is a section of the chains taken on the line 5—5 of Figure 4.

Figure 1:
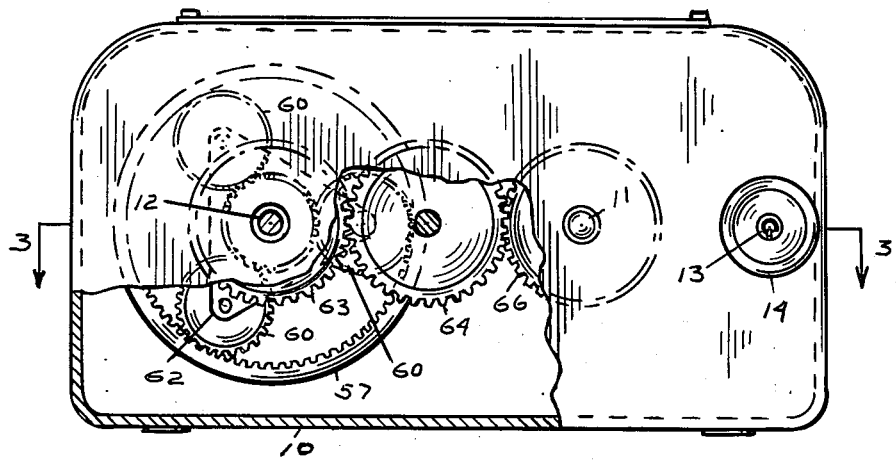
Fig. 1 is an end view of the transmission casing, partly broken away to disclose the elements of the planetary differential.

Referring now to Figure 1 of the drawings: The casing 10 has mounted therein the drive shaft 11 and the driven shaft 12, so called for the purpose of description; actually the driving force may be applied through either one of the said shafts. The speed regulating shaft is shown at 13 and the hand wheel at 14.

Figure 2:
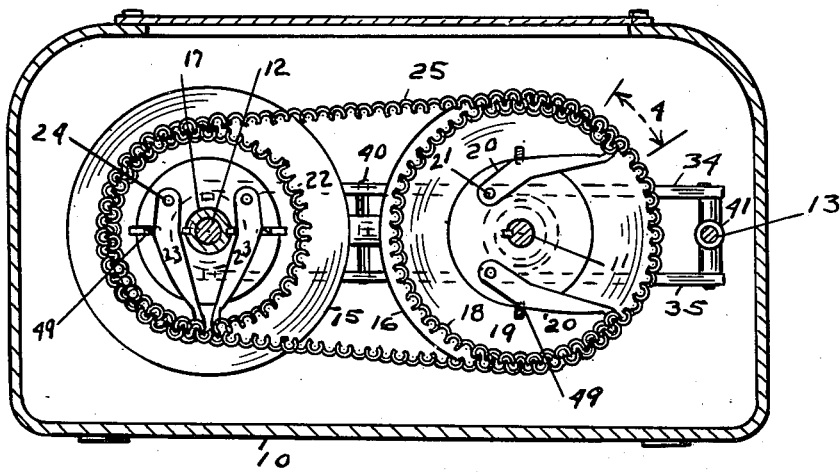
Fig. 2 is a vertical section on the line 2—2 of Figure 3 and shows the disks of the expansible assembly units and the driving chain in mesh with adjustable and collapsible chain elements attached to the said disks.

In Figure 2 a cross section on the line 2—2 of Figure 3 shows two bevel faced disks 15 and 16. The disk 16 is slidably keyed on the shaft 11 and the disk 15 is slidably keyed on a sleeve 17 which runs freely on the shaft 12. The collapsible chain 18 rests on the bevel 19 and is attached at its extremities to the arms 20 which are pivotally mounted on the disk at 21.

The collapsible chain 22 rests on the bevel of the disk 15 and is attached to the arms 23 which are pivotally mounted on the said disk at 24.

The drive chain 25 operatively connects the driver and the driven assembly units, being in mesh on the collapsible chains as shown.

Referring now to Figure 3, the disks 15 and 16 are shown to be mounted oppositely to the disks 28 and 29 which are slidably mounted in the same manner as before described. The disks 15 and 28 and 16 and 29 comprise the principal driver and driven assembly units which are numbered 30 and 31 respectively, and these elements thus combined form adjustable V channels 32 and 33 which may be expanded, or contracted oppositely by the sliding of the disks when actuated by means of the levers 34 and 35 which have studs 36 engaging grooves 37 in the flange members 38. The said levers being adjustable by means of the right and left hand threads 39 on the regulating shaft 13 which engages the members 41. When the hand wheel 14 is turned the assembly units expand and contract oppositely with respect to the driver and driven means, the levers swinging on the pivots 40 which are supported by connection to the casing 10.

The drive chain 25 and the collapsible chains 18 and 22 are similar in general construction, varying only in slight differences of link contour designed to facilitate the mesh at all degrees of curvature. The link construction is shown enlarged in Figures 4 and 5. The link plates 44 are held together by the pivots 45 which extend outwardly from the sides and have buffer sleeves 46 attached. These extended portions form outriders 47 which contact on the beveled surfaces of the disks and cause the chains to approach, or to recede from the centers as the said disks are expanded or contracted, and the V channels are made accordingly wider, or narrower.

Further details of the disk construction are as follows; reference being had to Figure 3. The disks are slotted at 48 and bolts 49 pass through these slots and engage the arms 20 and 23 by means of shoulders 50. Beveled buffers 51 engage the sides of the disks. Thus, when the disks expand, the bolts 49 are moved toward the center and force the arms 20—23 with them and draw in the disk chains. This bolt construction is the same on both driver and driven elements. It should be noted that the assembly unit 32 is slidable on the sleeve and over the key 70 and that the sleeve runs freely on the shaft 12; while the assembly unit 33 is slidable directly on the shaft 11 and the key 52.

The contact of the chain outriders 47 expands the chains when the disks of the assembly units contract. The bolts 49 and the arms 20—23 draw in the chains when the disks expand.

The relative speeds of the shafts 11 and 12 are compounded by the action of the planetary differential which is grouped at 56—see Figure 3. This differential comprises a ring gear 57 mounted on a flange, or spider 58 which is integral with the sleeve 17. Within this assembly a pinion 59 is keyed to the shaft 12. This pinion is in mesh with a group of gears 60 which mesh also with the ring gear 57 and are mounted on studs 61 in a plate 62 which is attached to a gear 63; the said plate 62 and gear 63 running free on the shaft 12. The gear 63 meshes with the idler gear 64 which is mounted intermediate the main shafts at 65, and the gear 64 meshes with a gear 66 which is keyed to the shaft 11.

The layout of the plantary assembly is shown in Figure 1 where the gears 63, 64 and 66 are shown within the casing and overlapping the plate 62 and the gears 60 which mesh with the ring gear 57.

It will thus be seen that the relative speeds of the shafts 11 and 12 may be varied and compounded by the changing ratio of the chain contact on the disks, and the correlation of the planetary differential, all under control of the adjusting wheel 14.

While the invention is shown and described in its preferred form, it is not limited to these exact details of construction; but should be broadly construed within the spirit and scope of the appended claims.

Having thus described the invention, what is claimed as new and desired to be secured by Letters Patent of the United States, is as follows:

1. In a mechanism for regulating transmission speeds, a laterally expansible disc assembly unit on each of a pair of shafts, and each consisting of a pair of bevelled discs inter-connected with radially movable members adapted to automatically move inwards as the discs are moved apart, a pair of arms pivoting on one disc of each unit and engaging said members to move the members outwards when they are moved together, a flexible chain drive element for each unit and connected with the ends of the arms and having outrider members which engage the discs and are caused to relatively approach and recede from the centers thereof by the corelated lateral expansion and retraction of said assembly units, and a continuous flexible chain engaged over and meshing with said flexible chain drive elements.

2. In a mechanism for regulating transmission speeds, a laterally expandible disc assembly unit on each of a pair of shafts, and each consisting of a pair of bevelled discs inter-connected with radially movable members adapted to automatically move inwards as the discs are moved apart, a pair of arms pivoting on one disc of each unit and engaging said members to move the members outwards when they are moved together, a flexible chain drive element for each unit and connected with the ends of the arms and having outrider members which engage the discs and are caused to relatively approach and recede from the centers thereof by the corelated lateral expansion and retraction of said assembly units, and a continuous flexible chain engaged over and meshing with said flexible chain drive elements, said flange chain drive elements at all times maintaining positions co-axially with the centers of the discs.

3. In a mechanism for regulating transmission speeds, a laterally expandible disc assembly unit on each of a pair of shafts, and each consisting of a pair of bevelled discs inter-connected with radially movable members adapted to automatically move inwards as the discs are moved apart, a pair of arms pivoting on one disc of each unit and engaging said members to move the members outwards when they are moved together, a flexible chain drive element for each unit and connected with the ends of the arms and having outrider members which engage the discs and are caused to relatively approach and recede from the centers thereof by the corelated lateral expansion and retraction of said assembly units, and a continuous flexible chain engaged over and meshing with said flexible chain drive elements, said bevel discs being bevelled on the inner and outer faces, said outrider members engaging the inner faces thereof.

4. In a mechanism for regulating transmission speeds, a laterally expandible disc assembly unit on each of a pair of shafts, and each consisting of a pair of bevelled discs inter-connected with radially movable members adapted to automatically move inwards as the discs are moved apart, a pair of arms pivoting on one disc of each unit and engaging said members to move the members outwards when they are moved together, a flexible chain drive element for each unit and connected with the ends of the arms and having outrider members which engage the discs and are caused to relatively approach and recede from the centers thereof by the corelated lateral expansion and retraction of said assembly units, and a continuous flexible chain engaged over and meshing with said flexible chain drive elements, said bevel discs being bevelled on the inner and outer faces, said outrider members engaging the inner faces thereof, and the radially movable members engaging through radial slots in the disc and having heads on their ends engaging the outer faces of the bevel discs.

5. In a mechanism for regulating transmission speeds, a laterally expandible disc assembly unit on each of a pair of shafts, and each consisting of a pair of bevelled discs inter-connected with radially movable members adapted to automatically move inwards as the discs are moved apart, a pair of arms pivoting on one disc of each unit and engaging said members to move the members outwards when they are moved together, a flexible chain drive element for each unit and connected with the ends of the arms and having outrider members which engage the discs and are caused to relatively approach and recede from the centers thereof by the corelated lateral expansion and retraction of said assembly units, and a continuous flexible chain engaged over and meshing with said flexible chain drive elements, said arms being pivoted eccentric of the discs.

6. In a mechanism for regulating transmission speeds, a laterally expandible disc assembly unit on each of a pair of shafts, and each consisting of a pair of bevelled discs inter-connected with radially movable members adapted to automatically move inwards as the discs are moved apart, a pair of arms pivoting on one disc of each unit and engaging said members to move the members outwards when they are moved together, a flexible chain drive element for each unit and connected with the ends of the arms and having outrider members which engage the discs and are caused to relatively approach and recede from the centers thereof by the corelated lateral expansion and retraction of said assembly units, and a continuous flexible chain engaged over and meshing with said flexible chain drive elements, said arms being pivoted eccentric of the discs, and having their outer ends movable in arms in which the flexible chain drive elements are always stretched tight.

FRED KAHN.